United States Patent [19]

Dudek et al.

[11] Patent Number: 5,293,553
[45] Date of Patent: Mar. 8, 1994

[54] SOFTWARE AIR-FLOW METER FOR AN INTERNAL COMBUSTION ENGINE

[75] Inventors: Kenneth P. Dudek, Rochester Hills; Vincent A. White, Northville, both of Mich.

[73] Assignee: General Motors Corporation, Detroit, Mich.

[21] Appl. No.: 804,857

[22] Filed: Dec. 6, 1991

Related U.S. Application Data

[63] Continuation-in-part of Ser. No. 653,931, Feb. 12, 1991.

[51] Int. Cl.$^5$ .................. F02M 51/00; F02M 63/00
[52] U.S. Cl. .................. 364/431.04; 73/118.2; 123/480; 123/494; 364/431.01
[58] Field of Search .............. 364/431.01, 431.03, 364/431.04, 431.05, 148-151, 510, 550, 571.01, 571.04, 571.05, 578; 73/117.2, 118.2; 123/463, 480, 488, 494

[56] References Cited

U.S. PATENT DOCUMENTS

| 4,269,156 | 5/1981 | Drellishek | 123/418 |
|---|---|---|---|
| 4,386,520 | 6/1983 | Nagaishi | 73/118 |
| 4,433,666 | 2/1984 | Masaki | 123/569 |
| 4,437,340 | 3/1984 | Csere et al. | 73/118 |
| 4,438,497 | 3/1984 | Willis et al. | 364/431.05 |
| 4,446,523 | 5/1984 | Reinke | 364/431.05 |
| 4,495,921 | 1/1985 | Sawamoto | 123/458 |
| 4,502,325 | 3/1985 | Klomp | 73/118 |
| 4,548,185 | 10/1985 | Pozniak | 123/571 |
| 4,599,694 | 7/1986 | Aposchanski et al. | 364/431.05 |
| 4,644,474 | 2/1987 | Aposchanski et al. | 364/431.05 |
| 4,664,090 | 5/1987 | Kabasin | 123/494 |
| 4,750,352 | 6/1988 | Kolhoff | 73/117.3 |
| 4,761,994 | 8/1988 | Sogawa | 73/118.2 |
| 4,860,222 | 8/1989 | Schmidt et al. | 364/550 |
| 4,893,244 | 1/1990 | Tang et al. | 364/431.03 |
| 4,969,439 | 11/1990 | Scotson | 123/419 |
| 4,986,243 | 1/1991 | Weissler, II et al. | 123/488 |
| 4,987,888 | 1/1991 | Funabashi et al. | 123/488 |
| 5,041,981 | 8/1991 | Sekozawa et al. | 364/431.05 |
| 5,051,909 | 9/1991 | Gomez et al. | 365/431.05 |

FOREIGN PATENT DOCUMENTS 3426812 11/1985 Fed. Rep. of Germany .
3432757 3/1986 Fed. Rep. of Germany .

OTHER PUBLICATIONS

Automotive Engine Control: A Linear Quadratic Approach by James Brian Lewis Jul. 1980.
State Functions and Linear Control Systems, 1967, McGraw-Hill, Inc. USA.
Probability, Random Variables and Stochastic Processes, 1965, McGraw-Hill, Inc. USA.

Primary Examiner—Jack B. Harvey
Assistant Examiner—Ed Pipala
Attorney, Agent, or Firm—Anthony Luke Simon

[57] ABSTRACT

A method for accurately determining the measure of mass airflow into an internal combustion engine is implemented with a controller that determines measures of various engine parameters, determines a prediction set including at least one predicted value of a measurable engine parameter and at least one predicted value of mass airflow into the engine, determines an estimation set including at least one estimated value of mass airflow into the engine and controls the engine in response to the estimated value of mass airflow.

25 Claims, 5 Drawing Sheets

SOFTWARE AIR-FLOW METER FOR AN INTERNAL COMBUSTION ENGINE

This application is a continuation-in-part of U.S. Ser. No. 07/653,931, filed on Feb. 12 1991, assigned to the assignee of this application, pending.

This invention relates to a method for measuring mass airflow into an engine and more particularly for predicting mass airflow based on measures of various engine parameters and a mathematical model. The subject of this application is related to copending patent applications U.S. Ser. Nos. 07/653,923, filed Feb. 12, 1991, entitled "Method for Estimating and Correcting Bias Errors in a Software Air Meter" now U.S. Pat. No. 5,070,846 and 07/732,386, filed Jul. 18, 1991, entitled "Method for Predicting R-Step Ahead Engine State Measurements", now U.S. Pat. No. 5,094,213 both filed concurrently with this application and assigned to the assignee of this application. The disclosures of patent application Ser. Nos. 07/653,923 and 07/732,386 are incorporated into this specification by reference.

BACKGROUND OF THE INVENTION

The air-fuel ratio in a combustion engine affects both engine emissions and performance. With strict modern emissions standards for automobiles, it is necessary to accurately control the air-fuel ratio of the automobile engine, requiring precise measurement of the mass airflow into the engine.

Currently, engine airflow is either measured with a mass airflow sensor or calculated by the speed-density method. In general, while mass airflow sensors are more accurate than speed-density systems, they are also more expensive.

What is desired is an airflow measurement system that eliminates the expensive airflow sensors of current fast response systems while offering the same improved air-fuel ratio control, easy calibration and adaptability to changing conditions.

SUMMARY OF THE PRESENT INVENTION

The present invention is a method of dynamically determining the airflow into an internal combustion engine using a mathematical model of the engine. The invention implements the technique of prediction and estimation to determine mass airflow into the engine. The prediction-estimation technique is a two step process: (1) model-based prediction, and (2) measurement-based correction (estimation). In the prediction step, a set of mathematical model parameters, past and present measures of various engine parameters, and an estimation set comprising previous estimations of mass airflow and manifold pressure are used to determine a prediction set comprising current predictions of two engine parameters, one measurable (i.e., via a sensor) and one not measured (i.e., no sensor need be implemented). Manifold absolute pressure is the measurable quantity and mass airflow is the non-measured quantity. In the estimation, or measurement-based correction step, the error in the prediction of the measurable quantity, here manifold absolute pressure, is used in combination with a correction set of estimator correction coefficients to determine the estimation set comprising estimated manifold absolute pressure and estimated mass airflow into the engine. The estimated mass airflow is then used to develop control commands for the vehicle engine, i.e., the estimated mass airflow may be used to schedule engine fuel delivery. The method is iteratively executed by a computer-based controller.

The set of model parameters may be determined through statistical reduction of data taken from a test vehicle that employs a mass airflow sensor. The estimator error coefficients are preferably determined through statistical optimization.

The engine parameters measured and used in prediction-estimation are manifold pressure, engine speed, air temperature, and throttle position. In the preferred implementation, parameters such as atmospheric pressure and, where present in the engine, the exhaust gas recirculation valve position and idle air control valve position are taken into account.

Use of the present invention allows precise air-fuel ratio control comparable to that achieved via fast response airflow meters while offering reduced costs through elimination of the expensive airflow sensor.

DETAILED DESCRIPTION OF THE INVENTION

Figure 1:
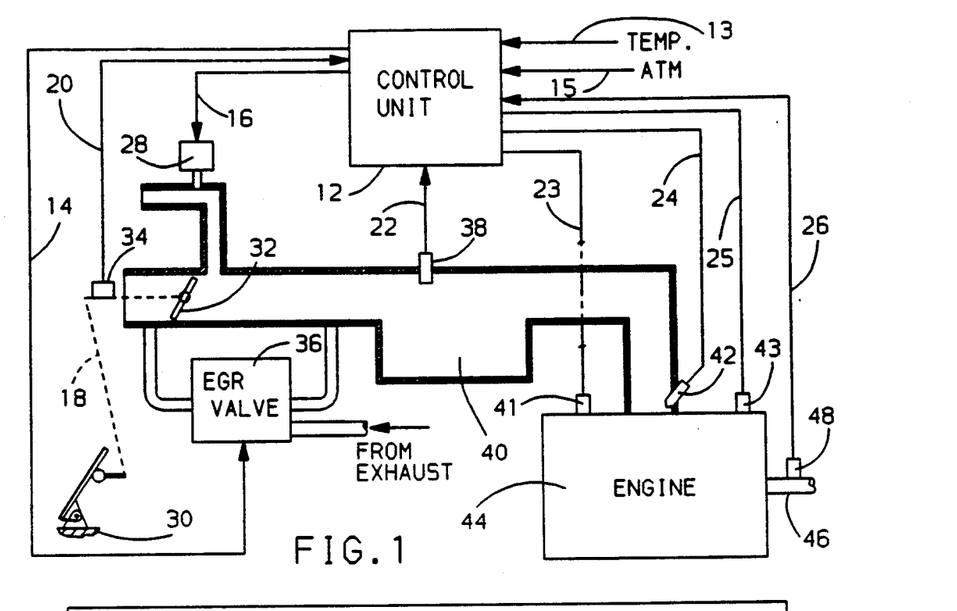
FIG. 1 is a schematic diagram showing an engine assembly, sensors, and control unit in which the invention may be implemented.

Referring to FIG. 1 the engine assembly shown includes the engine 44, fuel injectors 42, spark plugs 41 and 43, air intake manifold 40, throttle 32, exhaust gas recirculation (EGR) valve 36, and idle air control (IAC) valve 28. Throttle 32 is controlled by accelerator pedal 30 as shown by dotted line 18 and the IAC valve 28, EGR valve 36, spark plugs 41 and 43, and fuel injectors 42 are controlled by controller 12 through lines 16, 14, 23, 25 and 24.

The states of the engine 44 (i.e., speed), throttle 32 (position), EGR valve 36 (position), IAC valve 28 (position), air (temperature and atmospheric pressure), and intake manifold 40 (pressure) comprise a set of engine parameters which are measured. Air temperature and atmospheric pressure are sensed by sensors (not shown) and input into the controller 12 through lines 13 and 15. The positions of the IAC valve 28 and the EGR valve 36 are determined from the commands on command lines 16 and 14, or they may be measured directly using position sensors (not shown). The throttle position and manifold pressure are sensed by sensors 34 and 38 and input into the control unit 12 through lines 20 and 22. Engine speed is measured through the sensor 48, which detects the rotations of output shaft 46, and input into the control unit 12 through line 26. The sensors mentioned above are all standard sensors, a variety of which are readily available to those skilled in the art.

Figure 2:
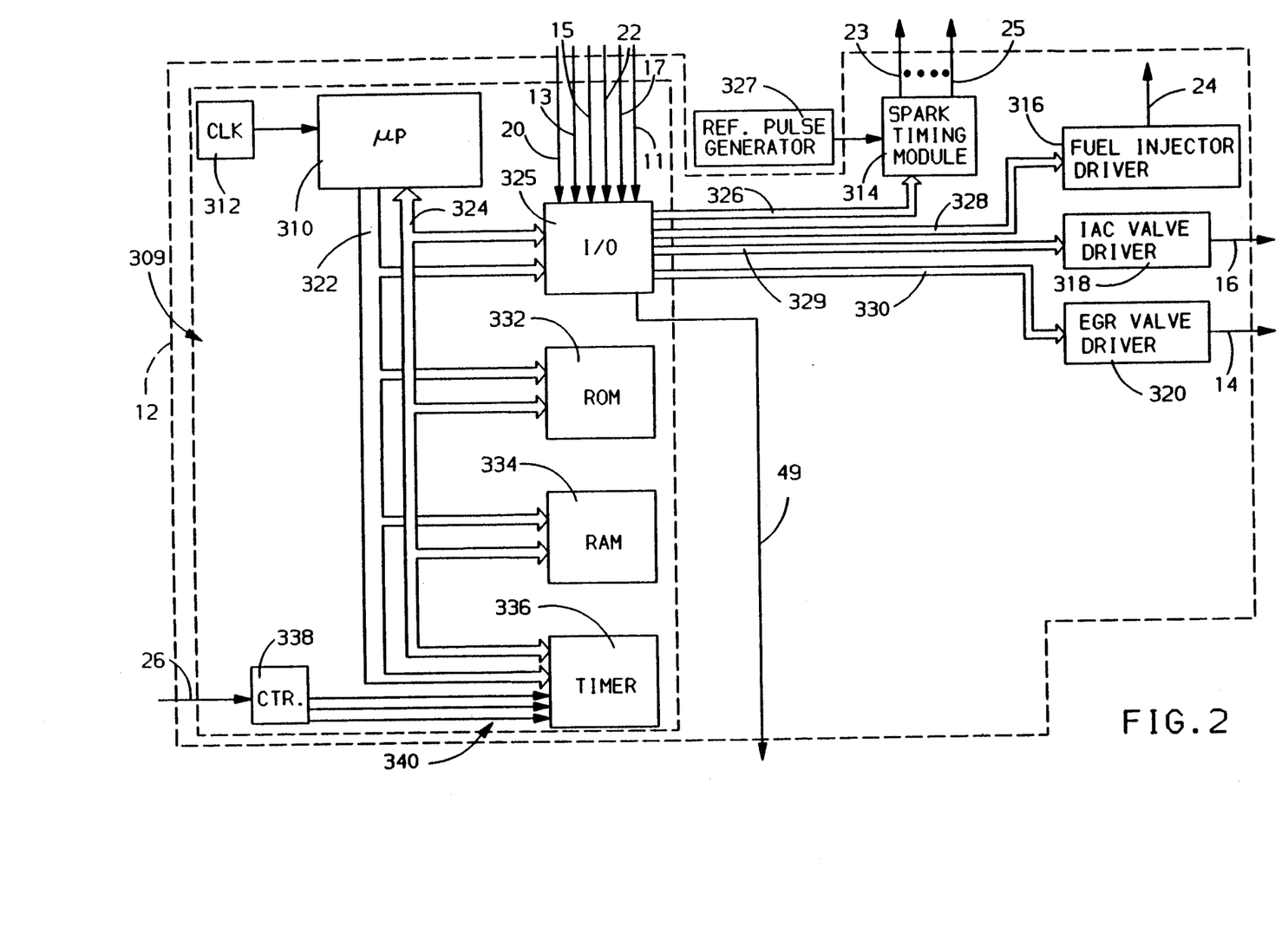
FIG. 2 is an example schematic diagram for the control unit of FIG. 1.

The control unit 12 is a standard control unit easily implemented by one skilled in the art and an example control unit 12 is shown in FIG. 2. The example control unit 12 shown includes microprocessor 310, clock 312, I/O unit 325, interfaces 314, 316, 318 and 320 for controlling engine spark timing, fuel injection, IAC valve position and EGR valve position in response to microprocessor 310. Microprocessor 310 executes an engine control program implementing this invention with standard engine control functions. The control program is stored in ROM 332 and RAM 334 is used for temporary storage of program variables, parameter measurements and other data. Microprocessor 310 sends commands to I/O unit 325, ROM 332, RAM 334 and timer 336 through bus 322 and transfers information between the various units through bidirectional data bus 324.

The I/O unit 325 and the timer unit 336 comprise means for receiving the measurement signals for the measured engine parameters. Engine speed data from sensor 48 is fed, through line 26, to counter 338, which counts the rotations of the engine output shaft 46. The counter 338 provides the count information to timer 336 through lines 340. From the information provided by counter 338 and timer 336, microprocessor 310 can easily compute the engine speed (RPM) and store the information in RAM 334. Various other input signals are provided through the I/O unit 325. Equivalent functions to those of microprocessor 310, I/O unit 325, ROM 332, RAM 334 and timer 336, all shown within box 309, can be performed by a single chip microcomputer, such as Motorola TM microcomputer No. MC68HC11.

Spark timing and dwell commands are determined by the microprocessor 310 (in accordance with this invention as described below) and those commands are provided to a standard spark timing module 314 through bus 326. Spark timing module 314 also receives engine position reference signals from a standard reference pulse generator 327 and controls the engine spark plugs through lines 23 and 25.

Buses 328, 329 and 330 provide commands from microprocessor 310 to interface units 316, 318 and 320, which are standard drivers for the engine fuel injection, idle air control valve and exhaust gas recirculation valve.

In the implementation of the invention, the control unit 12 determines the measures of the engine parameters including EGR valve position, IAC valve position, manifold pressure, engine speed, temperature, and atmospheric pressure and uses the measurements in the prediction-estimation process (explained in more detail below) to determine an accurate measure of the mass airflow into the engine. Once an accurate measure of the mass airflow into the engine is determined, the fuel injectors 42 can be controlled through lines 24 so that a proper air fuel ratio enters the engine 44. The mass airflow into the engine can also be used together with other engine parameters to determine the ignition timing for spark plugs 41 and 43.

Many engines do not have an IAC valve 28 or an EGR valve 36, but as will be explained below, their presence is not necessary for the successful implementation of the invention. Furthermore, the atmospheric pressure need not be determined for successful implementation of the invention. Taking atmospheric pressure into account, however, does increase the accuracy of the computed mass airflow measurement.

Figure 3:
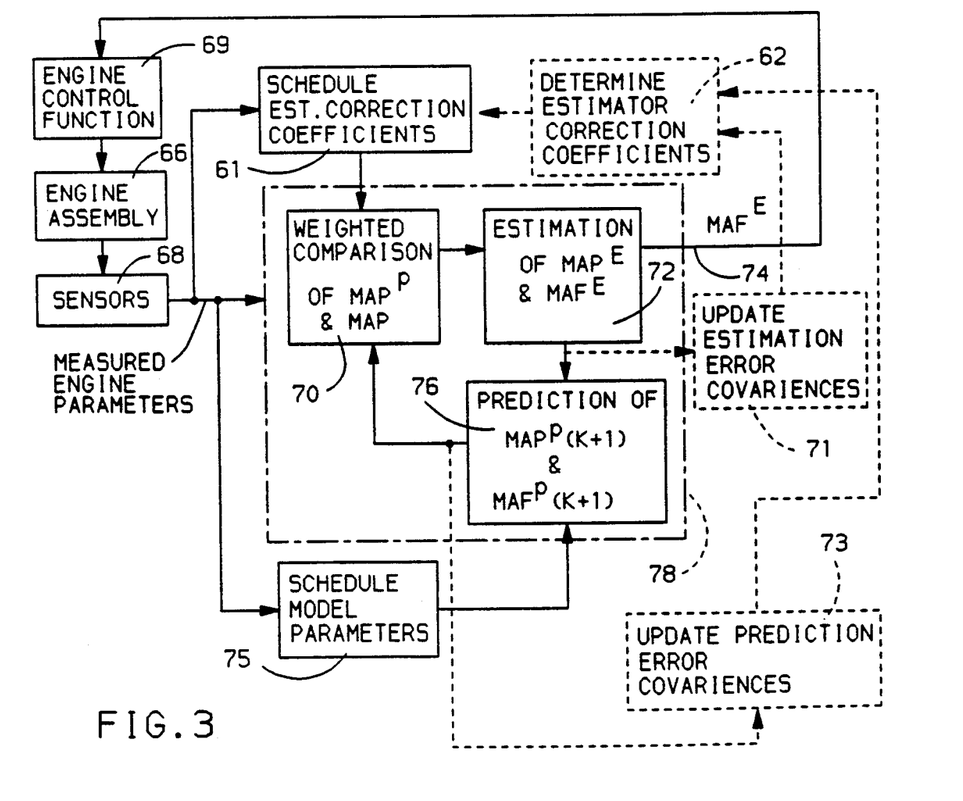
FIG. 3 is a schematic diagram showing the prediction-estimation method implemented by the present invention.

Implementation of prediction-estimation mathematical modeling to calculate mass airflow into the engine can be further explained with reference to FIG. 3. Block 66 represents the engine assembly whose parameters are measured by sensors 68 and used by the predictor-estimator 78. As can be seen by the arrangement of blocks 70, 72, and 76, the prediction-estimation method operates in a loop.

As will be explained, the prediction-estimation method is a dynamic process whose output depends upon previous measurements and estimations. For this reason, various parameters of the system must be initialized, during vehicle start-up or system reset.

After initialization, the estimation set, comprising estimations of mass airflow and manifold absolute pressure, is computed through blocks 70 and 72 in response to (i) a previously calculated prediction set, including predicted manifold absolute pressures (the measurable engine parameter) and mass airflows, and (ii) a weighted comparison of a previously predicted manifold pressure and the actual measured manifold pressure. The weighted comparison takes into account the present measure of manifold absolute pressure, the prediction set, and a correction set of fixed predetermined correction coefficients. The prediction set, containing new predictions of manifold absolute pressure and mass airflow, is determined at block 76 in response to (i) the estimation set determined at block 72, (ii) the measured engine parameters, and (iii) a linear model comprising a set of fixed predetermined model parameters. Line 74 indicates that the estimated mass airflow, $MAF^3$, from the estimation set, is used in the engine control function block 69 as a measure of mass airflow, to control the engine assembly 66. Note that the predicted mass airflow, $MAF^P$, from the prediction set, may be used in the engine control function block 69 in place of $MAF^3$. However, the optimal implementation is to use $MAF^3$.

The coefficients of the correction set used in the weighted comparison in block 70 are preferably predetermined in block 62 in a test vehicle through a statistical optimization process such as Kalman filtering and scheduled, based upon two independent engine parameters, at block 61. The set of model parameters is predetermined through statistical reduction of data taken from a test vehicle and scheduled at box 75.

For purposes of further clarification, initialization and operation of a basic system implementing the present invention will be described in the first example:

EXAMPLE 1

For a basic implementation of the invention, the time function variables used are throttle position (TPS(k-f)), predicted manifold absolute pressure ($MAP^P$(k-f)), and predicted mass airflow into the engine ($MAF^P$(k-f)), where k is the current time event and f is an integer at least zero. To simplify explanation, vector notation is used. Vector P(k) represents previous measurements of throttle position and vector $X^P(k)$ represents the prediction set containing previous predictions of manifold absolute pressure (the measurable engine parameter) and mass airflow into the engine, e.g., $$P(k) = \begin{pmatrix} TPS(k-1) \\ \cdot \\ \cdot \\ \cdot \\ TPS(k-e) \end{pmatrix}, \text{ and}$$

-continued $$X^p(K) = \begin{pmatrix} MAP^p(k-j) \\ MAP^p(k-j+1) \\ \vdots \\ MAP^p(k) \\ MAP^p(k-i) \\ MAP^p(k-i+1) \\ \vdots \\ MAP^p(k) \end{pmatrix},$$

where e, j, and i are predetermined integers which are system constants, and k is the current time event. During initialization, the vectors P(k) and $X^p(k)$ are given values of throttle positions, predicted manifold pressures, and predicted mass airflows typically found during engine idle. These values can be stored in a system ROM.

The system then enters the prediction-estimation loop where it first measures and stores in memory the present engine parameters, here: throttle position, TPS(k), engine speed, RPM(k), manifold pressure, MAP(k), and temperature, T(k), block 68. The past and present measures of engine parameters can be expressed as a vector U(k), e.g., $$U(k) = \begin{pmatrix} TPS(k) \\ P(k) \\ RPM(k) \\ T(k) \end{pmatrix}.$$

The set of estimator correction coefficients is then retrieved from ROM or RAM depending upon the implementation of the system. As will be explained below, the estimator correction coefficients are predetermined and scheduled at block 61, e.g., found from a three dimensional look-up table in ROM based upon two independent engine parameters, preferably engine speed and manifold pressure. A detailed description of the determination of the correction coefficients will be set forth further below.

The correction set of estimator error correction coefficients may be represented by a vector G, e.g., $$G = \begin{pmatrix} G_{1,j} \\ G_{1,j-1} \\ \vdots \\ G_{1,0} \\ G_{2,i} \\ G_{2,i-1} \\ \vdots \\ G_{2,0} \end{pmatrix}.$$

Implementation of statistical optimization of the correction set of estimator correction coefficients reveals that the correction set comprising coefficients G for a given engine operating point eventually achieves a virtual steady state. This allows the determination of G to be done off line, e.g., in a test vehicle, and the values for G to be programmed into ROM in the control unit. This method is implemented because the matrix equations required by block 62 become very extensive if many variables are used in the model, requiring more computer execution time than would normally be available in an automotive engine controller.

Referring again to FIG. 3, after the correction set comprising vector G is retrieved, it is used at block 70 in the weighted comparison of predicted manifold pressure, $MAP^p(k)$, and measured manifold pressure, MAP(k). The weighted comparison may be done either as a separate step from determining the estimations or as part of the estimation determination step. The weighted comparisons can be described as the following functions:

$$G_{1,j}(MAP(k) - MAP^p(k)); \text{ and}$$

$$G_{2,j}(MAP(k) - MAP^p(k)).$$

The estimation set containing estimations of manifold pressure and mass airflow into the engine, $MAP^3(k-f)$ and $MAF^3(k-f)$, may be described in vector notation by a vector $X^e(k)$, e.g., $$X^e(K) = \begin{pmatrix} MAP^e(k-j) \\ MAP^e(k-j+1) \\ \vdots \\ MAP^e(k) \\ MAF^e(k-i) \\ MAF^e(k-i+1) \\ \vdots \\ MAF^e(k) \end{pmatrix}.$$

Boxes 70 and 72 define vector $X^e(k)$ according to the following vector equation:

$$X^3(k) = X^p(k) + G(MAP(k) - MAP^p(k)),$$

which is equivalent to the series of equations:

$$MAP^e(k-j) = MAP^p(k-j) + G_{1,j}(MAP(k) - MAP^p(k)),$$
$$MAP^e(k-j+1) = MAP^p(k-j+1) + G_{1,j-1}(MAP(k) - MAP^p(k)),$$
$$\vdots$$

-continued $$MAP^e(k) = MAP^p(k) + G_{1,0}(MAP(k) - MAP^p(k)),$$

$$MAF^e(k - i) = MAF^p(k - i) + G_{2,i}(MAP(k) - MAP^p(k)).$$

$$MAF^e(k - i + 1) = MAF^p(k - i + 1) + G_{2,i-1}(MAP(k) - MAP^p(k)),$$

$$\vdots$$

$$MAF^e(k) = MAF^p(k) + G_{2,0}(MAP(k) - MAP^p(k)).$$

The estimated mass airflow, $MAF^e(k)$, on line 74 is used as an accurate measure of the mass airflow into the engine by engine control function block 69 to control the engine assembly 66.

The set of predetermined model parameters used in the prediction step may be described as five subsets of parameters $\{a_1, a_2, \ldots a_{j+i+2}\}$, $\{b_1, b_2, 111 b_{j+i+2}\}$, $\{c_1, c_2, 111 c_{e+3}\}$, $\{d_1, d_2, \ldots d_{3+3}\}$, and $\{h_1, h_2\}$, and define matrices A, B, and C as follows:

$$A = \begin{pmatrix} 0 & 1 & 0 & \ldots & 0 & 0 & 0 & \ldots \\ 0 & 0 & 1 & 0 & \ldots 0 & & 0 & \ldots \\ & & 0 & & & & & \\ & & & & 0 & & & \\ & 0 & & 0 & 1 & 0 & 0 & 0 \ldots 0 \\ a_1 & a_2 & \ldots & a_j & a_{j+1} & a_{j+2} & a_{j+3} & \ldots a_{j+i+2} \\ 0 & 0 & \ldots & 0 & 0 & 1 & 0 & \ldots 0 \\ 0 & 0 & \ldots & 0 & & 0 & 1 & 0 \ldots \\ & & & & & & 0 & \\ & & & & & & & 0 \\ 0 & & & 0 & 0 & 0 & 0 & \ldots 0 \; 1 \\ b_1 & b_2 & \ldots & b_j & b_{j+1} & b_{j+2} & b_{j+3} & \ldots b_{j+i+2} \end{pmatrix} \begin{matrix}(1)\\(2)\\ \\ \\ \\ (j+1)\\(j+2)\\ \\ \\ \\ \\ (j+i+2)\end{matrix}$$

$$B = \begin{pmatrix} 0 & \ldots & 0 \\ & & \\ & & \\ 0 & & 0 \\ c_1 & \ldots & c_{e+3} \\ 0 & \ldots & 0 \\ & & \\ & & \\ 0 & \ldots & 0 \\ d_1 & \ldots & d_{e+3} \end{pmatrix} \begin{matrix}(1)\\(2)\\ \\ \\ (j+1)\\(j+2)\\ \\ \\ \\ (j+i+2)\end{matrix}, \text{ and } C = \begin{pmatrix} 0 \\ \\ \\ 0 \\ h_1 \\ 0 \\ \\ \\ 0 \\ h_2 \end{pmatrix}.$$

These subsets comprising the set of model parameters are found through statistical regression of data taken from a test vehicle with an independent mass airflow meter to measure actual mass airflow, MAF. The model parameters $\{a_1, a_2, \ldots a_{j+i+2}\}$, $\{c_1, c_2, 111 c_{e+3}\}$, and $h_1$ are the gain coefficients for finding $MAP^p$ and the model parameters $\{b_1, b_2, \ldots b_{j+i+2}\}$, $\{d_1, d_2, \ldots d_{e+3}\}$, and $h_2$, are the gain coefficients for finding $MAF^p$.

The statistical regression process includes running the test vehicle in various states to obtain sets of engine parameter data and actual mass airflow measurements for each time event k. Optimization problems are then set up to find the set of model parameters ($a_{fs}$, $b_{fs}$, $c_{fs}$, $d_{fs}$, and $h_{fs}$) for each engine state to minimize the following functions:

$$\sum_{l=1}^{n-1} [w_1(1)(MAP(l+1) - MAP^M(l+1))]^2, \text{ and}$$

-continued $$\sum_{l=1}^{n-1} [w_2(1)(MAF(l+1) - MAF^M(l+1))]^2,$$

where n is the number of data observations for the specific engine state, $w_1(1)$ and $w_2(1)$ are positive weighting constants chosen to improve model fit in critical areas and to ensure statistical integrity of the model and may vary as a function of 1, and where:

$$MAP^M(l+1) = a_1 MAP(l-j) + a_2 MAP(l-j+1) + \ldots + \\ a_{j+1} MAP(1) + a_{j+2} MAF(l-i) + a_{j+3} MAF(l-i+1) + \ldots + \\ a_{j+i+2} MAF(l) + c_1 TPS(l) + c_2 TPS(l-1) + \ldots + \\ c_{e+2} RPM(l) + c_{e+3} T(l) + h_1, \text{ and}$$
$$MAF^M(l+1) = b_1 MAP(l-j) + b_2 MAP(l-j+1) + \ldots + \\ b_{j+1} MAP(l) + b_{j+2} MAF(l-i) + b_{j+3} MAF(l-i+1) + \ldots + \\ b_{j+i+2} MAF(l) + d_1 TPS(l) + d_2 TPS(l-1) + \ldots + \\ d_{e+2} RPM(l) + d_{e+3} T(l) + h_2.$$

One skilled in the art can easily perform the above statistical regression and determine the model parameters, therefore the determination of the model parameters will not be set forth in further detail here.

Internal combustion engines are typically nonlinear and the prediction step set forth below is a linear function with different sets of model parameters to approximate the engine at different operating points. The sets of model parameters are therefore scheduled for accurate predictions. Likewise, as mentioned above, the correction set of estimator correction coefficients, G, is scheduled. The scheduling may be done with reference to any two independent engine parameters, preferably engine speed, $RPM(k)$, and manifold pressure, $MAP(k)$.

Scheduling the sets of the model parameters may be done several different ways. One scheduling method is to use single schedules of parameters and estimator correction coefficients over defined (RPM, MAP) ranges. Another scheduling method is to determine the sets of parameters and estimator correction coefficients at different (RPM, MAP) engine operating points and to interpolate between the determined parameters to find a different set of parameters and estimator correction coefficients for each (RPM, MAP) engine operating point. With either of these scheduling methods, the parameters may be retrieved from a three dimensional look-up table in computer memory based on engine speed and manifold pressure, or any other two independent engine parameters. Additionally, any other suitable scheduling method may be used.

After the set of model parameters is retrieved, at block 75, the prediction set comprising predicted manifold absolute pressures and mass airflows for the next time event, represented by the vector $X^p(k+1)$, is determined at block 76 according to the following vector equation:

$$X^P(k+1) = AX^e(k) + BU(k) + C,$$

which is equivalent to the group of equations:

$$MAP^p(k-j+1) = MAP^e(k-j+1),$$
$$MAP^p(k-j+2) = MAP^e(k-j+2),$$
$$\vdots$$
$$MAP^p(k) = MAP^e(k),$$
$$MAP^p(k+1) = a_1 MAP^e(k-j) + a_2 MAP^e(k-j+1) + \ldots +$$
$$a_{j+1} MAP^e(k) + a_{j+2} MAF^e(k-i) + a_{j+3} MAF^e(k-i+1) + \ldots +$$
$$a_{j+i+2} MAF^e(k) + c_1 TPS(k) + c_2 TPS(k-1) + \ldots + c_{e+2} RPM(k) +$$
$$c_{e+3} T(k) + h_1,$$
$$MAF^p(k-i+1) = MAF^e(k-i+1),$$
$$MAF^p(k-i+2) = MAF^e(k-i+2),$$
$$\vdots$$
$$MAF^p(k) = MAF^e(k),$$
$$MAF^p(k+1) = b_1 MAP^e(k-j) + b_2 MAP^e(k-j+1) + \ldots +$$
$$b_{j+1} MAP^e(k) + b_{j+2} MAF^e(k-i) + b_{j+3} MAF^e(k-i+1) + \ldots +$$
$$b_{j+i+2} MAF^e(k) + d_1 TPS(k) + d_2 TPS(k-1) + \ldots + d_{e+2} RPM(k) +$$
$$d_{e+3} T(k) + h_2.$$

After the prediction set, $X^p(k+1)$, is determined, the engine parameters for the next time event are measured and a new estimation set is computer at blocks 70 and 72. The system then repeats the steps of estimation and prediction in a loop.

Blocks 62, 71, and 73 represent one method of how the correction set of estimator correction coefficients G may be predetermined, Kalman filtering. For purposes of explanation, the determination of G will be set forth in an example where G is predetermined in a test vehicle.

After the model parameters are found, the invention is implemented in a control system in the test vehicle in a similar manner as explained above. The difference is that blocks 62, 71, and 73 are added to the control routine for computing the correction set of estimator correction coefficients, which are now a function of time and will be represented by the vector G(k) where:

$$G(k) = \begin{pmatrix} G_{1,j}(k) \\ G_{1,j-1}(k) \\ \vdots \\ G_{1,0}(k) \\ G_{2,i}(k) \\ G_{2,i-1}(k) \\ \vdots \\ G_{2,0}(k) \end{pmatrix}.$$

After each determination of the estimation set, the estimation error covariances (error variances dependent upon multiple variables) are updated at block 71 and after each determination of the prediction set, the prediction error covariances are updated at block 73. Based upon the estimation and prediction error covariances, the correction coefficients are updated at block 62. The correction coefficients are then sorted into schedules based upon two independent engine parameters.

More particularly, during initialization of the system, variables representing the MAP measurement error variance, $\gamma$, and the process noise covariance, Q, are input into the controller. One example for the matrix Q is:

$$Q = \begin{pmatrix} q_1 & 0 & \ldots & & 0 \\ 0 & q_2 & \cdot & & \cdot \\ \cdot & 0 & & & \cdot \\ \cdot & & \cdot & & 0 \\ 0 & 0 & \ldots & 0 & q_{j+i+2} \end{pmatrix},$$

where $q_1 = q_2 = \ldots = q_{j+1}$ = [error variance of the MAP model computed in the above mentioned statistical reduction of data used to determine the model parameters], and $q_{j+1} = q_{j+2} = \ldots = q_{j+i+2}$ = [error variance of the MAF model computed in the above mentioned statistical reduction of data used to determine the model parameters]. In general, Q may be any positive semi-definite matrix.

At block 62, G(k) is computed according to the equation:

$$G(k) = Z(k)L^T/(LZ(k)L^T + \gamma),$$

where Z(k) is the state prediction error covariance at time k, L a matrix such that:

$$L = [0 \ldots 0 \ 1 \ 0 \ldots 0],$$

with the "1" in the (j+1)st position, and $L^T$ the transpose of L (a column matrix with all zeros except for a "1" in the (j+1)st position). At block 72, $X^e(k)$ is computed using G(k), such that:

$$X^e(k) = X^p(k) + G(k)(MAP(k) - MAP^p(k)).$$

At block 71, the state estimator error covariance S(k) is updated where:

$$S(k) = (I - G(k)L)Z(k),$$

where I is the following identity matrix:

$$I = \begin{pmatrix} 1 & 0 & \cdots & & 0 \\ 0 & 1 & & & \cdot \\ \cdot & & \cdot & & \cdot \\ \cdot & & & \cdot & \cdot \\ \cdot & & & \cdot & 0 \\ 0 & \cdots & & 0 & 1 \end{pmatrix} \begin{matrix} (1) \\ (2) \\ \\ \\ \\ (j+i+2) \end{matrix}$$

The prediction step at box 76, where $X^p(k+1)$ is computed is the same as explained above. At block 73, the state prediction error covariance $Z(k)$ is updated such that:

$$Z(k+1) = AS(k)A^T + Q,$$

where $A^T$ is the transpose of A.

Running the test vehicle in an engine operating range around a particular engine operating point for several seconds, e.g., 1000 cycles, will result in stabilization of vector $G(k)$ for that particular engine operating range. The vector G for that particular engine operating range can then be set equal to $G(k)$, where $k=1000$.

Kalman filtering is only one method of determining G. Any group of constants which tend to lessen the error in the estimates can be chosen for G. The limitation for the system is that the roots of the polynomial $f(z)$, described below, must be within the unit circle. The polynomial $f(z)$ is the determinant of a matrix M, defined as:

$$M = zI - A + GLA.$$

The above described example is a general case where TPS is considered over the past (e) time events, $MAP^p$ is considered over the past (j) time events, and $MAF^p$ is considered over the past (i) time events. If (e), (j), and (i) are large, then the calculations become quite complicated. Balancing considerations of simplicity and system accuracy, the preferred implementation sets these variables as follows: $e=3$, $j=1$, and $i=0$. It should be noted that any of the engine parameters may be treated as time function variables, in other words, the present and past values of any of the engine parameters may be used, but the balance between simplicity and accuracy favors the specific implementations set forth herein.

EXAMPLE 2

Many automobile engines have exhaust gas recirculation (EGR) valves and/or idle air control (IAC) valves. If one or both of these valves are present in the vehicle, it is preferred that the mathematical model take these engine parameters into account. In these cases, when the other engine parameters, such as $TPS(k)$, $RPM(k)$, and $T(k)$ are measured, the valve positions, $EGR(K)$ and $IAC(k)$, are measured (e.g., through detection of the valve position commands) and included in the vector $U(k)$. Additionally, the set of model parameters includes gain factors $c_f$, $c_{f+1}$, $d_f$ and $d_{f+1}$ which are included in matrix B and are multiplied by the valve position measurements, $EGR(k)$ and $IAC(k)$, in the calculation of the prediction set, $X^P(k+1)$.

EXAMPLE 3

Another engine parameter that is preferably taken into account to increase the accuracy of the estimations is atmospheric pressure, $ATM(k-f)$. Past measurements of this parameter can be considered to increase accuracy and included as part of $P(k)$ and $U(k)$, where:

$$U(k) = \begin{pmatrix} TPS(k) \\ TPS(k-1) \\ \cdot \\ \cdot \\ \cdot \\ TPS(k-e) \\ RPM(k) \\ IAC(k) \\ EGR(k) \\ T(k) \\ ATM(k) \\ ATM(k-1) \\ \cdot \\ \cdot \\ ATM(k-g) \end{pmatrix},$$

where g is a system constant. The atmospheric pressure is measured when the other engine parameters are measured. Additionally, the set of model parameters includes gain factors $c_f \ldots c_{f+g+1}$ and $d_f \ldots d_{f+g+1}$ which are included in matrix B and are multiplied by the measurements of atmospheric pressure, $ATM(k-f)$, in the calculation of the prediction set, $X^P(k+1)$. The atmospheric pressure $ATM(K)$ may be measured directly with a pressure sensor, or indirectly using the manifold pressure sensor 38 in FIG. 1. The manifold pressure sensor can measure approximate atmospheric pressure at key on, before the engine starts, and at wide open throttle.

Figure 4:
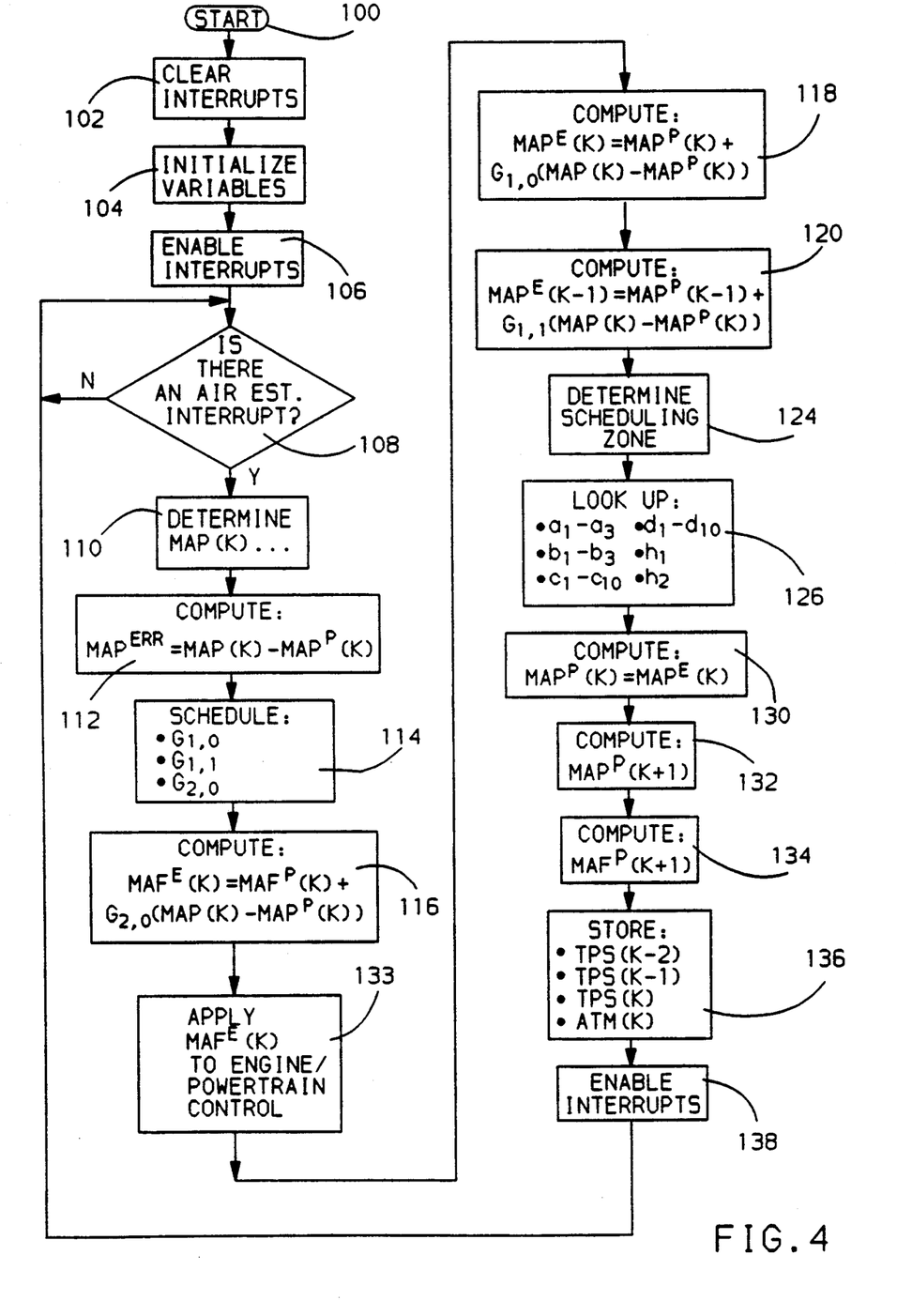
FIG. 4 is a flow diagram for a computer implementation of the present invention.

FIG. 4 represents a computer flow diagram of the preferred implementation of the invention. This implementation takes into account atmospheric pressure and the IAC and EGR valves and sets: $e=3$, $j=1$, $i=0$, and $g=1$.

Steps 100, 102, 104, and 106 startup the system and initialize the variables. At step 108, the system checks for an interrupt signal, which is produced by the engine controller whenever it requires a new mass airflow estimate. If there is an interrupt, the program proceeds into the prediction-estimation loop starting at box 110, where the engine parameters $MAP(k)$, $RPM(k)$, $TPS(k)$, $IAC(k)$, $EGR(k)$, $T(k)$, and $ATM(k)$ are measured and received by the computer. At step 112, the computer computes a value for manifold pressure error, $MAP^{err}$, where $MAP^{err} = MAP(K) - MAP^P(k)$. At step 114 the correction set of estimator correction coefficients are scheduled and retrieved.

At steps 116, 118, and 120, the estimation set comprising $MAF^e(k)$, $MAP^e(k)$, and $MAP^e(k-1)$ is computed. At step 133, the $MAF^e(k)$ is used to control the vehicle engine/powertrain. The computer determines the model parameter schedule zone utilizing $RPM(K)$ and $MAP(K)$ at step 124. At step 126, the computer looks up the set of model parameters from ROM memory.

At blocks 130, 132 and 134, the prediction set is determined. $MAP^P(K)$ is computed at step 130 such that $MAP^P(K) = MAP^e(k)$ and, at step 132, $MAP^P(k+1)$ is computed according to the equation:

$$MAP^P(k+1) = a_1 MAP^e(k-1) + a_2 MAP^e(k) +$$
$$a_3 MAF^e(k) + c_1 TPS(k) + c_2 TPS(k-1) + c_3 TPS(k-2) +$$
$$c_4 TPS(k-3) + c_5 RPM(k) + c_6 IAC(k) + c_7 EGR(k) +$$
$$c_8 T(k) + c_9 ATM(K) + c_{10} ATM(k-1) + h_1.$$

At step 134, $MAF^P(k+1)$ is computed according to the equation:

$$MAF^P(k + 1) = b_1MAP^e(k - 1) + b_2MAP^e(k) + b_3MAF^e(k) + d_1TPS(k) + d_2TPS(k - 1) + d_3TPS(k - 2) + d_4TPS(k - 3) + d_5RPM(k) + d_6IAC(k) + d_7EGR(k) + d_8T(k) + d_9ATM(k) + d_{10}ATM(k - 1) + h_2.$$

At step 136, the computer prepares for the next time event by storing $TPS(k-2)$, $TPS(k-1)$, $TPS(k)$, and $ATM(k)$. At step 138 the interrupts are enabled and the program loops back to step 108.

EXAMPLE 4

In certain engine systems it is preferable to take into account past measures of engine speed, $RPM(k-f)$. It has been found that taking paste measures of engine speed into account increases the accuracy of the mass airflow estimates during engine idle. To consider past measures of engine speed, the past measurements must be initialized and included in vector $U(k)$, wherein:

$$U(k) = \begin{pmatrix} TPS(k) \\ TPS(k-1) \\ \vdots \\ TPS(k-e) \\ RPM(k) \\ RPM(k-1) \\ \vdots \\ RPM(k-s) \\ IAC(k) \\ EGR(k) \\ T(k) \\ ATM(k) \\ ATM(k-1) \\ \vdots \\ ATM(k-g) \end{pmatrix}$$

Additionally, the set of model parameters include gain factors $c_f \ldots c_{f+s}$ and $d_f 1 1 1 d_{f+s}$, which are included in matrix B and are multiplied by the past measurements of engine speed, $RPM(k-f)$, in the calculation of the prediction set, $X^P(k+1)$.

EXAMPLE 5

Many vehicles with IAC valves do not have position feedback of the IAC valve. In such vehicles the IAC valve position command is used as the measure of IAC valve position, $IAC(k)$. If the IAC valve develops a positional bias error, then a consistent error in the predicted and estimated manifold absolute pressures may occur. A method for estimation and correction of IAC valve position bias error is the subject of copending U.S. patent application, Ser. No. 07/653,923, assigned to the assignee of the present invention. Relevant portions of the method for estimation and correction of IAC valve position bias errors are also set forth here because implementation of the estimation and correction method may significantly improve the functioning of this invention.

While the engine runs in a steady state, the measures of the various engine parameters remain virtually unchanged from one time event to the next. Likewise the vector $U(k)$ remains virtually constant while the engine is in steady state. It can be shown the prediction and estimation sets, represented by vectors $X^P(k)$ and $X^e(k)$, also achieve a virtual steady state. In such a steady state condition, if there is an error between the predicted manifold pressure, $MAP^P(k)$, and the actual manifold pressure, $MAP(k)$, it is fairly consistent. Under certain conditions, this error may be attributable to IAC valve positional bias error.

Certain inputs, such as $T(k)$, $ATM(k)$, and $RPM(k)$ are fairly immune to bias error because of the sensor characteristics and/or the sensor information processing in the vehicle control unit. At engine idle, the throttle is in a closed position, so error in throttle position, $TPS(k)$, can be eliminated at idle. If the subsets of model parameters, A, B, and C, and the estimator error coefficients, G, are well chosen, they do not cause a consistent error. Once all of the other factors are eliminated, which can be done at idle (a steady state condition), prediction errors can be attributable to IAC valve positional bias error.

U.S. Pat. No. 5,070,846, mentioned above explains that a quantization of IAC valve position error may be determined as:

$$\delta u^e = (MAP_{ss} - MAP^P_{ss})/\omega_r,$$

where $\delta u^e$ is an estimate of the IAC valve bias error, $MAP_{ss}$ is the steady state value for $MAP(K)$ at engine idle, $MAP^P_{ss}$ is the steady state value for $MAP^P(K)$ at engine idle, and $\omega_r$ is the term in the r'th row (the same row in $U(k)$ in which $IAC(K)$ is in) and the j+1st column of a matrix 2, defined below. The matrix, 2, is defined by the equation:

$$Q = ((I - A(I - GL))^{-1})B,$$

where the superscript "$-1$" denotes matrix inverse, I is a $(j+i+2) \times (j+i+2)$ identity matrix, and L is a matrix $L = [0\ 0 \ldots 0\ 1\ 0 \ldots 0]$ with the "1" occurring in the $j+1$st entry. Once $\delta u^e$ is determined, a corrected value for IAC valve position equal to $(IAC(k) + \delta u^e)$ can be used in vector $U(k)$ in place of $IAC(K)$ to calculate $X^P(k+1)$, nullifying the positional bias error of the IAC valve.

Figure 5:
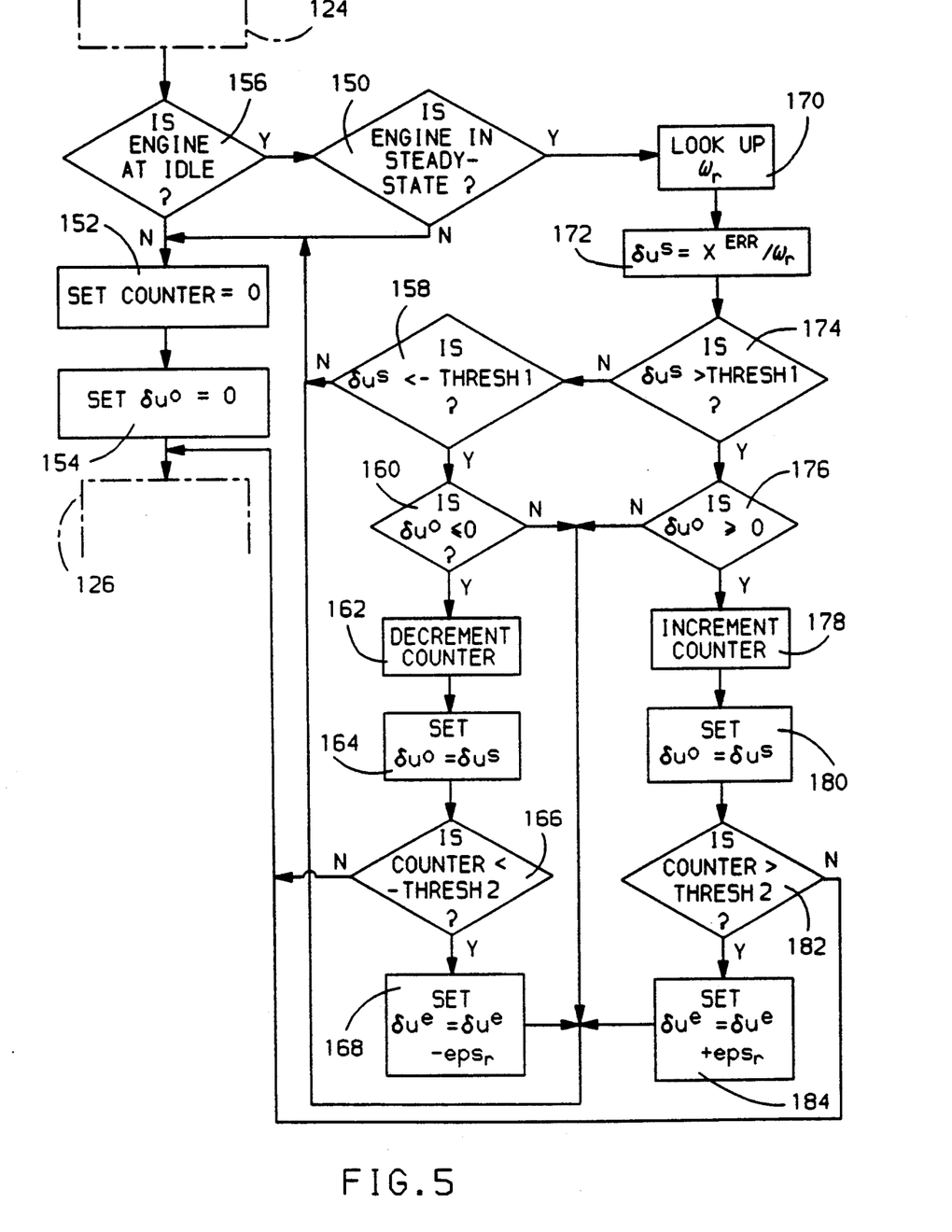
FIG. 5 is a flow diagram for a computer implementation of a method for estimating and correcting bias errors in parameter measurements.

FIG. 5 shows the preferred implementation of the method for estimating and correcting bias errors in in the present invention. In the scheme shown, the IAC valve bias error is corrected in small steps, $eps_r$. The decision to take the $eps_r$ step is based on the sign of the bias estimate, $\delta u^e$, the sign of the last bias estimate, and the value of the counter that keeps track of the number of successive times the bias estimates of the same sign exceed a calibrated threshold. This method keeps the value of the sum $(IAC(k) + \delta u^e)$ from wildly varying with every iteration of the routine shown.

More particularly, the routine is implemented between blocks 124 and 126 in FIG. 4, but initialization of the variables required for the routine in FIG. 5 occurs at block 104 in FIG. 4. After the scheduling zone is determined in block 124, block 156 tests to see if the engine is at idle. The engine is at idle if the scheduling zone determined at block 124 is the scheduling zone corresponding to engine idle. If the engine is not at idle, the counter is set to zero at block 152, the last bias estimate, $\delta u^o$, is set to zero at block 154, and the computer continues with its routine at block 126 as described above.

If the engine is found to be at idle at block 156, then block 150 tests to see if the engine is in a steady state. The engine may be said to be in steady state if:

$$TPS(k) \approx TPS(k-1) \approx TPS(k-2) \approx TPS(k-3),$$

$$PRM(k) \approx RPM(k-1) \approx RPM(k-2) \approx RPM(k-3),$$
and $$MAP(k) \approx MAP(k-1) \approx MAP(k-2) \approx MAP(k-3).$$

Other steady state tests may be employed. If the engine is not in a steady state, then the program continues to block 152. If the engine is in a steady state, then the program moves to block 170 where a value for $\omega_r$ is determined from a lookup table in computer memory.

A present IAC valve error estimate, $\delta u^s$, is determined at block 172 according to the equation: $\delta u^s = -MAP^{err}/\omega_r$. At block 174, the present error estimate is compared to a first threshold (e.g., one increment in IAC valve position command), if the present error estimate is greater than the first threshold then the the routine proceeds to block 176, otherwise to block 158. At block 176, the previous error estimate, $\delta u^o$, is compared to zero. If the previous error estimate is less than zero, then the computer jumps to block 152. If the previous error estimate is greater than or equal to zero, then the counter is incremented at block 178 and the present error estimate becomes the previous error estimate at block 180.

If the counter is not greater than the second threshold (e.g., 8) at block 182, then the computer jumps to block 126. If the counter is greater than the second threshold at block 182, then the IAC error correction value, $\delta u^e$, is updated at block 184 so that $\delta u^e = \delta u^e + eps_r$. The computer then moves to block 152.

If, at block 174, the present error estimate was not greater than the first threshold, then it is compared to a negative of the first threshold at block 158. If the present error estimate is not less than a negative of the first threshold at block 158, then the computer jumps to block 152. If the present error estimate is less than a negative of the first threshold at block 158, then the previous error estimate is compared to zero at block 160. If the previous error estimate is greater than zero at block 160, then the computer jumps to block 152. If the previous error estimate is not greater than zero at block 160, then the computer moves to block 162 where the counter is decremented and to block 164 where the present error estimate becomes the previous error estimate.

At block 166, the counter is compared to a negative of the second threshold. If the counter is not less than a negative of the second threshold at block 166, then the computer jumps to block 126. If the counter is less than a negative of the second threshold at block 166 then block 168 updates the IAC error correction value, $\delta u^e$, such that $\delta u^e = \delta u^e - eps_r$ and then continues to block 152.

When an error estimation routine such as the routine in FIG. 5 is implemented with this invention, the computation at blocks 132 and 134 of the prediction set, comprising $MAP^P(k+1)$ and $MAF^P(k+1)$, uses values equal to the sum $(IAC(k) + \delta u^e)$ in place of $IAC(K)$ to achieve higher accuracy in the prediction of mass airflow into the engine.

Figure 6:
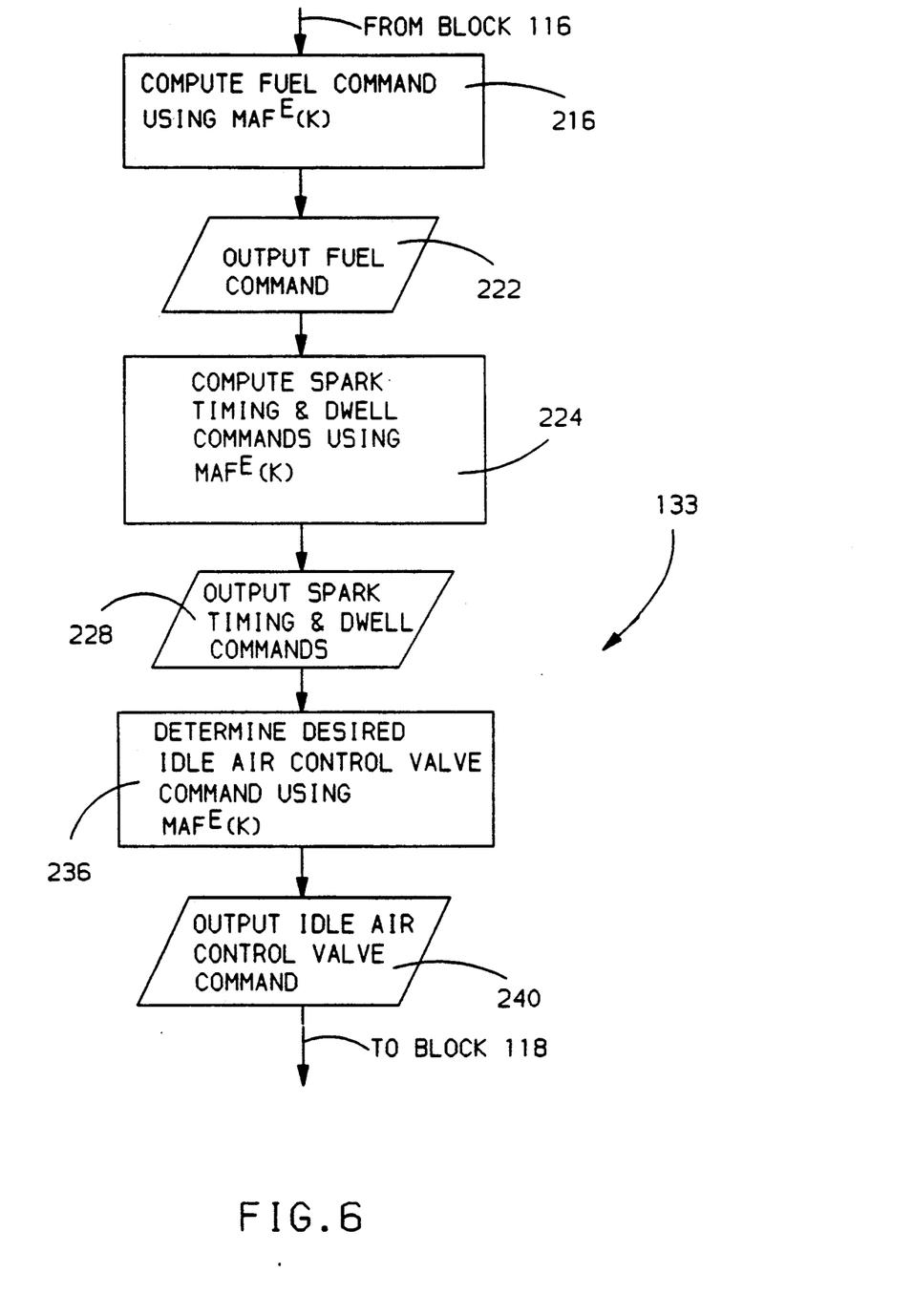
FIG. 6 is a general flow diagram pertaining to block 133 in FIG. 4.

Referring to FIG. 6, block 216 illustrates that this invention may be implemented with typical fuel control using the estimated mass airflow, $MAF^e(k)$, in place of the actual measurements of mass airflow typically used. No other modification needs to be made to the fuel control system.

At block 222, the fuel command determined at block 216 using estimated mass airflow is output to control the engine fuel injection in a conventional manner well-known to those skilled in the art.

Block 224 illustrates that this invention may be implemented with typical spark control using estimated mass airflow similarly to how the estimated mass airflow is used for air-fuel ratio control. More specifically, a straight-forward substitution of the estimated mass airflow, $MAF^e(k)$, in place of the conventional measured value is used to obtain the spark timing and dwell commands (or equivalents if a different type of system is used) in a manner well-known to those skilled in the art. At block 228, the spark timing and dwell commands are output to a standard engine spark timing control module to control engine spark timing.

Block 236 illustrates that this invention may also be implemented with typical idle air control valve control using estimated mass airflow, similarly to how estimated mass airflow is used for air-fuel ratio control. As described above, a straight-forward substitution of the estimated mass airflow, $MAF^e(k)$, in place of the conventional measured value is used to determine an idle air control valve command. At block 240, the idle air control valve command is output to control the engine idle air control valve in a manner well-known to those skilled in the art.

The above example engine - powertrain controls may be easily implemented by those skilled in the art without further elaboration herein. Furthermore, the above engine - powertrain control examples are not the only engine - powertrain controls with which this invention may be implemented. The possible applications of engine - powertrain control in response to estimated mass airflow are endless and new applications which fall within the scope of this invention may occur to those skilled in the art.

The subject invention is not limited to the above described examples. Various improvements and modifications to the present invention may occur to those skilled in the art and fall within the scope of this invention as set forth below.

The embodiments of the invention in which an exclusive property or privilege is claimed are defined as follows:

1. An engine - controller combination, comprising:
   a vehicle engine;
   means for determining measures of a set of engine parameters and for providing measurement signals indicative of said measures; and
   a microprocessor control unit, including (i) means for receiving the measurement signals, (ii) means for determining a prediction set including at least one predicted value of a measurable engine parameter and at least one predicted value of mass airflow into the engine, (iii) means for determining an estimation set including at least one estimated value of mass airflow into the engine, and (iv) means for controlling the engine in response to the estimated value of mass airflow, wherein
   the microprocessor control unit iteratively (i) determines the prediction set in response to (a) the measurement signals, (b) a linear model comprising a set of fixed predetermined model parameters, and (c) the estimation set, and (ii) determines the estimation set in response to (a) a present measure of the measurable engine parameter, (b) the prediction set, and (c) a correction set of fixed predetermined correction coefficients wherein the estimated value of the mass airflow into the engine is a substantially accurate measure of actual mass airflow into the engine.

2. The combination of claim 1, wherein the measurable engine parameter is manifold absolute pressure.

3. The combination of claim 1, wherein the controlling means controls fueling of the engine by developing a fuel command in response to the estimated mass airflow and outputting the fuel command to a fuel injection control unit, which fuels the engine in response to the fuel command, thereby improving engine air-fuel ratio control.

4. The combination of claim 3, wherein the measurable engine parameter is manifold, absolute pressure.

5. The combination of claim 1, wherein the controlling means controls engine spark through spark timing and dwell commands output to a spark timing control module, by developing the spark timing and dwell commands in response to the prediction set and outputting the spark timing and dwell commands to the spark timing control module.

6. The combination of claim 5, wherein the measurable engine parameter is manifold absolute pressure.

7. The combination of claim 1, wherein the controlling means controls an idle air control valve through an idle air control valve command, by developing the idle air control valve command in response to the prediction set and outputting the idle air control valve command to the idle air control valve.

8. The combination of claim 7, wherein the measurable engine parameter is manifold absolute pressure.

9. The combination of claim 1, wherein:

the prediction set of a given engine event comprises a vector $X^p(k+1)$ where k is a present engine event, the measures of the set of engine parameters comprise a vector $U(k)$, the estimation set comprises a vector $X^e(k)$, and the set of fixed predetermined model parameters comprises matrices A, B, and C, the prediction set being determined by a relation:

$$X^p(k+1) = AX^e(k) + BU(k) + C;\ \text{and}$$

the correction set comprises a vector G, and $X^p(k)$ and $X(k)$ represent predicted and measured values of the measurable engine parameter at event k, respectively, the estimation set being determined by a relation:

$$X^e(k) = X^p(k) + G(X(k) - X^p(k)).$$

10. The combination of claim 9, wherein the measurable engine parameter is manifold absolute pressure.

11. The combination of claim 10, wherein the set of model parameters is predetermined through statistical regression.

12. The combination of claim 10, wherein the set of model parameters is scheduled according to two independent engine parameters.

13. The combination of claim 10, wherein the correction set is predetermined through Kalman filtering.

14. The combination of claim 1, wherein the correction set is predetermined through Kalman filtering.

15. The combination of claim 1, wherein the set of engine parameters includes throttle position and engine speed.

16. The combination of claim 10, wherein the set of engine parameters includes throttle position and engine speed.

17. The combination of claim 15, wherein the set of engine parameters also includes at least one member of a set comprising: manifold absolute pressure, idle air control valve position, exhaust gas recirculation valve position, atmospheric pressure and air temperature.

18. The combination of claim 16, wherein the set of engine parameters also includes at least one member of a set comprising: manifold absolute pressure, idle air control valve position, exhaust gas recirculation valve position, atmospheric pressure and air temperature.

19. An engine - controller combination, comprising:

a vehicle engine;

means for determining measures of a set of engine parameters and for providing measurement signals indicative of said measures for every event k; and a microprocessor control unit, including (i) means for receiving the measurement signals, (ii) means for determining a prediction set including at least one predicted value of a measurable engine parameter and at least one predicted value of mass airflow into the engine, (iii) means for determining an estimation set including at least one estimated value of mass airflow into the engine, and (iv) means for controlling the engine in response to the estimated value of mass airflow, wherein the microprocessor control unit:

initializes a set of variables including the measures of the set of engine parameters and the estimation set for events preceding time k, and the prediction set for events preceding time k+1; thereafter iteratively:

receives the measurement signals for event k;

determines an error signal in response to a difference between a measure of the measurable engine state at event k and a prediction of the measurable engine state for event k;

schedules a correction set of fixed predetermined correction coefficients in response to two of the measurement signals representing independent engine parameters;

determines the estimation set in response to the prediction set, the error signal, and the correction set;

schedules a set of fixed model parameters in response to the two measurement signals representing independent engine parameters;

determines the prediction set in response to the measurement signals for event k and preceding events, the estimation set, the set of fixed model parameters;

determines a control command in response to the estimated mass airflow; and applies the control command to the engine.

20. The combination of claim 19, wherein the measurable engine parameter is manifold absolute pressure.

21. The combination of claim 19, wherein the set of model parameters and the correction set are scheduled from control unit memory.

22. The combination of claim 19, wherein the set of engine parameters includes throttle position and engine speed.

23. The combination of claim 20, wherein the set of engine parameters includes throttle position and engine speed.

24. The combination of claim 22, wherein the set of engine parameters also includes at least one member of a set comprising: manifold absolute pressure, idle air control valve position, exhaust gas recirculation valve position, atmospheric pressure and air temperature.

25. The combination of claim 23, wherein the set of engine parameters also includes at least one member of a set comprising: manifold absolute pressure, idle air control valve position, exhaust gas recirculation valve position, atmospheric pressure and air temperature.

* * * * *